United States Patent
Narumi

(10) Patent No.: US 7,978,574 B2
(45) Date of Patent: Jul. 12, 2011

(54) OPTICAL INFORMATION RECORDING METHOD, OPTICAL INFORMATION RECORDING APPARATUS, AND OPTICAL INFORMATION RECORDING MEDIUM

(75) Inventor: Kenji Narumi, Osaka (JP)

(73) Assignee: Panasonic Corporation, Osaka (JP)

( * ) Notice: Subject to any disclaimer, the term of this patent is extended or adjusted under 35 U.S.C. 154(b) by 1362 days.

(21) Appl. No.: 10/585,851

(22) PCT Filed: Jun. 17, 2005

(86) PCT No.: PCT/JP2005/011127
§ 371 (c)(1),
(2), (4) Date: Jul. 12, 2006

(87) PCT Pub. No.: WO2006/033188
PCT Pub. Date: Mar. 30, 2006

(65) Prior Publication Data
US 2008/0219116 A1    Sep. 11, 2008

(30) Foreign Application Priority Data
Sep. 24, 2004    (JP) .................................. 2004-276829

(51) Int. Cl.
*G11B 7/00*    (2006.01)
(52) U.S. Cl. ..................................... 369/47.53; 369/116
(58) Field of Classification Search ............... 369/47.53, 369/53.18, 59.11, 116
See application file for complete search history.

(56) References Cited

U.S. PATENT DOCUMENTS

| | | | |
|---|---|---|---|
| 5,872,763 A | 2/1999 | Osakabe | |
| 6,459,666 B1 | 10/2002 | Yokoi | |
| 6,771,577 B2 | 8/2004 | Yokoi | |
| 6,925,042 B2 * | 8/2005 | Nakajo | 369/47.53 |
| 2003/0072235 A1 * | 4/2003 | Naoi et al. | 369/53.18 |
| 2003/0090981 A1 | 5/2003 | Yokoi | |
| 2003/0156519 A1 * | 8/2003 | Yokoi | 369/59.11 |
| 2004/0136305 A1 | 7/2004 | Kato et al. | |

FOREIGN PATENT DOCUMENTS

| | | |
|---|---|---|
| JP | 8-203079 | 8/1996 |
| JP | 10-64064 | 3/1998 |
| JP | 2001-76341 | 3/2001 |
| JP | 2002-203317 | 7/2002 |
| JP | 2002-245624 | 8/2002 |

* cited by examiner

*Primary Examiner* — Hoa T Nguyen
*Assistant Examiner* — Kim-Kwok Chu
(74) *Attorney, Agent, or Firm* — Wenderoth, Lind & Ponack, L.L.P.

(57) ABSTRACT

A laser drive circuit is utilized to record data with a good signal quality over a wide range of linear velocities to an optical information recording medium. Specifically, the laser drive circuit of an optical information recording apparatus sets a ratio of a recording power to a power at which a reproduction signal quality reaches a threshold value to be relatively low at low velocities, and relatively high at high velocities.

41 Claims, 11 Drawing Sheets

OPTICAL INFORMATION RECORDING METHOD, OPTICAL INFORMATION RECORDING APPARATUS, AND OPTICAL INFORMATION RECORDING MEDIUM

BACKGROUND OF THE INVENTION

1. Field of Invention

The present invention relates to an optical information recording method for recording information to an optical information recording medium with which data is optically recorded and reproduced, and to an apparatus for recording the same, and a recording medium, and more particularly relates to a method for recording information to an optical information recording medium with which information is recorded at a plurality of different linear velocities.

2. Description of the Related Art

Optical disks, optical cards, optical tapes, and so forth have been proposed and developed in recent years as media for optically recording data. Optical disks have become especially popular as media that allow large volumes of data to be recorded and reproduced at high density.

For instance, in the case of a phase-change optical disk, data is recorded and reproduced by the following method. The recording film of an optical disk is irradiated with a laser beam focused by an optical head and stronger in power than the reproduction power (this power level will be referred to as the recording power, and expressed as Pp), and when the temperature of the recording film goes over the melting point, the molten portion is rapidly cooled as the laser beam is transmitted, and this forms a mark in an amorphous state. When the recording film is irradiated with a laser beam that has been focused enough to raise the temperature of the recording film to at least its crystallization temperature but below its melting point (this power level will be referred to as the erasure power, and expressed by Pb), the irradiated portion of the recording film enters a crystalline state. As a result, a recorded pattern consisting of marks (amorphous regions) and spaces (crystalline regions) corresponding to a data signal is formed on the optical disk. The data is then reproduced by taking advantage of the difference in reflectance between the crystalline and amorphous regions.

As described above, to form marks on a medium, it is necessary to modulate the power level of the emitted laser beam at least between an erasure power and a recording power. The pulse waveform used in the modulation operation is called a recording pulse. Many recording methods for forming a single mark with a plurality of recording pulses have already been disclosed. The plurality of recording pulses is called a recording pulse train. FIG. 10a shows an example of a recording pulse train. A pulse at the front part of the recording pulse train is called the leading pulse 501, a pulse at the end of the recording pulse train is referred to as the trailing pulse 503, and a pulse between the leading pulse 501 and the trailing pulse 503 is called a multi-pulse 502. The number of recording pulses that make up the recording pulse train varies with the recording code length (that is, the length of the recording code with respect to a channel clock period Tw), and at the shortest code length, there may be only one recording pulse. The intensity of the laser beam is modulated as shown in FIG. 10b on the basis of this recording pulse train. As a result, a mark 302 is formed on a track 301 as shown in FIG. 10c. A method in which a mark is formed by using a laser irradiation waveform in which the pulse level is varied between the leading portion and the trailing portion as shown in FIG. 11, instead of using a recording pulse train, has also been disclosed.

At present, DVDs and other such optical information recording media primarily make use of constant linear velocity (CLV) recording. This is a system for recording data at substantially the same linear velocity, transfer rate, and linear density over the entire surface of the medium. An advantage therefore is that there is no change in the laser beam irradiation conditions or in heating/cooling conditions during recording and reproduction. On the other hand, since the rotational speed of the medium varies with the recording or reproduction position (that is, the radial position) on the medium, controlling the rotational speed changes of a spindle motor is essential.

In contrast, a constant angular velocity (CAV) recording system, in which the rotational speed and the linear density of the medium are kept substantially constant over the entire surface of the medium, has been proposed. Unlike with a CLV recording system, a CAV recording system does not require control of the rotational speed changes of a spindle motor for rotating the medium, so an advantage is that the spindle motor and the control circuit thereof can be produced at lower cost. Also, there is no need to wait for a recording or reproduction operation until a specific rotational speed is attained after seeking the recording or reproduction position, so the access speed with respect to the medium can be shortened. On the other hand, a CAV recording system, the linear velocity and the transfer rate of the medium vary with the recording or reproduction position in the medium. Therefore, the conditions under which the medium is irradiated with the laser beam, and the heating/cooling conditions vary with the recording or reproduction position.

Improving recorded signal quality in either of these systems is important in terms of recording or reproducing large volumes of data at high density. Accordingly, methods have already been disclosed for improving signal quality by adjusting the recording power with respect to a certain linear velocity (the recording or reproduction position in the case of CAV recording). One such method that has been disclosed involves recording a test signal while the recording power or the erasure power is varied, and determining the power levels on the basis of the recorded test signal so that the asymmetry or degree of modulation of the reproduction signal is optimized (see Patent Document 1, for example).

However, with the above-mentioned conventional recording method, if the linear velocity is varied over a large range in CAV recording, the optimal conditions will be different for each linear velocity, so a data signal cannot be recorded stably and with good signal quality. This problem will now be described.

During recording at a high linear velocity, the spindle motor rotates at high speed. Consequently, if there is even a slight axial runout or eccentricity to the disk, this will have a major impact on servo operation. Specifically, if there is axial runout in the disk, the actuator of the optical head will oscillate strongly in the optical axis direction. If there is eccentricity in the disk, the actuator will oscillate strongly in the direction parallel to the plane of the disk. If this oscillation exceeds the response characteristics of the actuator, the actuator will be unable to keep up with the axial runout or eccentricity of the disk, defocusing or off-tracking will occur, and the signal cannot be recorded stably.

On the other hand, during recording at a low linear velocity, the relative speed between the laser spot and the medium is lower, and cooling after melting caused by laser irradiation is slower, so recrystallization proceeds from the edges of the molten part, and the remaining portion becomes a mark. Accordingly, as shown in FIG. 12, a molten region 303 is larger than a mark 302, and the end of the molten region extends all the way to the walls 304 of a track 301 (that is, a guide groove or land). As a result, this affects the fine shape of the walls 304 (causing looseness), recrystallization does not occur in part of the molten region reaching the walls 304, and parts of the mark stick to the walls 304. Consequently, the shape of the mark is distorted and this lowers the quality of the reproduction signal.

Patent Document 1: Japanese Unexamined Patent Publication No. H10-64064.

BRIEF SUMMARY OF THE INVENTION

It is an object of the present invention to solve the above-mentioned problems encountered in the past, and to provide an optical information recording method, an optical information recording apparatus, and an optical information recording medium with which data can be recorded to and reproduced from a given medium at stable and good signal quality over a wide range of linear velocities.

To achieve the stated object, the present invention is an optical information recording method, comprising, irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, wherein the recording power is controlled so as to satisfy (Pp1/Ppth1)<(Pp2/Ppth2), where Ppth1 is the threshold value of the recording power at which the quality of a reproduction signal drops under a specific value when a test signal is recorded at a first linear velocity v1 with the erasure power fixed and the recording power varied, Ppth2 is the threshold value of the recording power at which the quality of the reproduction signal drops under a specific value when the test signal is recorded at a second linear velocity v2 that is higher than the first linear velocity v1, with the erasure power fixed and the recording power varied, Pp1 is the recording power when the information is recorded at the first linear velocity v1, and Pp2 is the recording power when the information is recorded at the second linear velocity v2.

With this method, a mark can be formed with no distortion at low linear velocities, and a satisfactory power margin can be ensured in recording at high linear velocities, so data can be recorded at good signal quality over a wider range of linear velocities.

In the above invention, the criterion for the quality of the reproduction signal may be the jitter of the reproduction signal.

In the above invention, the criterion for the quality of the reproduction signal may be a value based on the error rate of the reproduction signal.

In the above invention, the criterion for the quality of the reproduction signal may be a value based on the degree of modulation of the reproduction signal.

In all of the above cases, it is possible to record data at good signal quality.

The present invention is also an optical information recording method, comprising, irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, wherein the recording power is controlled so as to satisfy (Pp1/Ppth1)<(Pp2/Ppth2), where Ppth1 is the threshold value of the recording power at which the quality of a reproduction signal drops under a specific value when a test signal is recorded at a first linear velocity v1, with the erasure power and the recording power varied such that the ratio between these powers is constant, Ppth2 is the threshold value of the recording power at which the quality of the reproduction signal drops under a specific value when the test signal is recorded at a second linear velocity v2 that is higher than the first linear velocity v1, with the erasure power and the recording power varied such that the ratio between these powers is constant, Pp1 is the recording power when the information is recorded at the first linear velocity v1, and Pp2 is the recording power when the information is recorded at the second linear velocity v2.

Again with this method, a mark can be formed with no distortion at low linear velocities, and a satisfactory power margin can be ensured in recording at high linear velocities, so data can be recorded at good signal quality over a wider range of linear velocities.

The present invention is also an optical information recording method, comprising, irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, wherein the recording power is controlled so as to satisfy a1<a2, where a1 is the asymmetry of the reproduction signal when a test signal is recorded at a first linear velocity v1, with the erasure power fixed and the recording power varied, and a2 is the asymmetry of the reproduction signal when the test signal is recorded at a second linear velocity v2 that is higher than the first linear velocity v1, with the erasure power fixed and the recording power varied.

The present invention is also an optical information recording method, comprising, irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, wherein the recording power is controlled so as to satisfy a1<a2, where a1 is the asymmetry of the reproduction signal when a test signal is recorded at a first linear velocity v1, with the erasure power and the recording power varied such that the ratio between these powers is constant, and a2 is the asymmetry of the reproduction signal when the test signal is recorded at a second linear velocity v2 that is higher than the first linear velocity v1, with the erasure power and the recording power varied such that the ratio between these powers is constant.

Again with these methods, a mark can be formed with no distortion at low linear velocities, and a satisfactory power margin can be ensured in recording at high linear velocities, so data can be recorded at good signal quality over a wider range of linear velocities.

The optical information recording method of the present invention is characterized in that the recording system is a CAV recording system.

With this method, data can be recorded at good signal quality regardless of where the recording or reproduction position is in the medium.

The optical information recording method of the present invention is characterized in that the recording power is controlled so that Pp is increased according to the increase in a linear velocity v when Pp is the recording power at the linear velocity v, which is a value between the first linear velocity v1 and the second linear velocity v2.

With this method, the recording power can be easily determined at an intermediate linear velocity.

The optical information recording method of the present invention is characterized in that the power level between recording pulses is controlled to be different from the erasure power.

Also, the optical information recording method of the present invention is characterized in that the power coefficient between recording pulses at the second linear velocity v2 is controlled to be higher than the power coefficient between recording pulses at the first linear velocity v1 when the power coefficient between recording pulses is α and α=(Pbtm−Pb)/(Pp−Pb), where Pp is the recording power, Pb is the erasure power, and Pbtm is the power level between recording pulses.

With this method, the cooling rate during recording can be optimally controlled according to the linear velocity, which means that data can be recorded at good signal quality.

To achieve the stated object, the optical information recording medium of the present invention is characterized in that information expressing the value of Pp1/Ppth1 and Pp2/Ppth2 is recorded.

Also, the optical information recording medium of the present invention is characterized in that information expressing the value of Pp1 and Pp2 is recorded.

Also, the optical information recording medium of the present invention is characterized in that information expressing the value of α1 and α2 is recorded.

With these media, the recording power suited to the linear velocity can be determined as soon as the medium is installed in the optical information recording apparatus.

The above-mentioned optical information recording medium is characterized in that the recording film is composed of a phase changing material, and the phase changing material contains germanium and tellurium, and also contains either tin or bismuth.

With this medium, there is less incomplete erasure during overwriting in recording at a high linear velocity, so data can be recorded at even better signal quality.

The optical information recording medium of the present invention is characterized by having a track divided into a plurality of sectors, having embossed tracks between the sectors, and the tracks being formed such that the center of the embossed tracks is shifted from the center of the recording tracks of the sectors.

With this medium, stable recording is possible even if off-tracking occurs as a result of actuator oscillation at the boundary between a recording track and an embossed track during recording at a high linear velocity.

To achieve the stated object, the present invention is an optical information recording apparatus for irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, comprising a linear velocity setting circuit for setting two different linear velocities, a recording pulse generation circuit for generating the recording pulses or the recording pulse train according to the setting result of the linear velocity setting circuit, a laser drive circuit for irradiating with the laser beam at the plurality of power levels on the basis of the recording pulse train, and a signal quality detecting circuit for detecting the quality of a reproduction signal, wherein the laser drive circuit controls the recording power so as to satisfy (Pp1/Ppth1)<(Pp2/Ppth2), where Ppth1 is the threshold value of the recording power at which the quality of a reproduction signal drops under a specific value when a test signal is recorded at a first linear velocity v1 with the erasure power fixed and the recording power varied, Ppth2 is the threshold value of the recording power at which the quality of the reproduction signal drops under a specific value when the test signal is recorded at a second linear velocity v2 that is higher than the first linear velocity v1, with the erasure power fixed and the recording power varied, Pp1 is the recording power when the information is recorded at the first linear velocity v1, and Pp2 is the recording power when the information is recorded at the second linear velocity v2.

The present invention is an optical information recording apparatus for irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, comprising a linear velocity setting circuit for setting two different linear velocities, a recording pulse generation circuit for generating the recording pulses or the recording pulse train according to the setting result of the linear velocity setting circuit, a laser drive circuit for irradiating with the laser beam at the plurality of power levels on the basis of the recording pulse train, and a signal quality detecting circuit for detecting the quality of a reproduction signal, wherein the laser drive circuit controls the recording power so as to satisfy (Pp1/Ppth1)<(Pp2/Ppth2), where Ppth1 is the threshold value of the recording power at which the quality of a reproduction signal drops under a specific value when a test signal is recorded at a first linear velocity v1, with the erasure power and the recording power varied such that the ratio between these powers is constant, Ppth2 is the threshold value of the recording power at which the quality of the reproduction signal drops under a specific value when the test signal is recorded at a second linear velocity v2 that is higher than the first linear velocity v1, with the erasure power and the recording power varied such that the ratio between these powers is constant, Pp1 is the recording power when the information is recorded at the first linear velocity v1, and Pp2 is the recording power when the information is recorded at the second linear velocity v2.

The present invention is an optical information recording apparatus for irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, comprising a linear velocity setting circuit for setting two different linear velocities, a recording pulse generation circuit for generating the recording pulses or the recording pulse train according to the setting result of the linear velocity setting circuit, a laser drive circuit for irradiating with the laser beam at the plurality of power levels on the basis of the recording pulse train, and a signal quality detecting circuit for detecting the quality of a reproduction signal, wherein the laser drive circuit controls the recording power so as to satisfy a1<a2, where a1 is the asymmetry of the reproduction signal when a test signal is recorded at a first linear velocity v1, with the erasure power fixed and the recording power varied, and a2 is the asymmetry of the reproduction signal when the test signal is recorded at a second linear velocity v2 that is higher than the first linear velocity v1, with the erasure power fixed and the recording power varied.

The present invention is an optical information recording apparatus for irradiating an optical information recording medium with a laser beam, forming marks or spaces so that the optical characteristics of a recording film are varied, forming the marks by recording pulses or a recording pulse train in which the power of the laser beam is switched between a plurality of power levels including at least a recording power and erasure power, and recording information at two different linear velocities, comprising a linear velocity setting circuit for setting two different linear velocities, a recording pulse generation circuit for generating the recording pulses or the recording pulse train according to the setting result of the linear velocity setting circuit, a laser drive circuit for irradiating with the laser beam at the plurality of power levels on the basis of the recording pulse train, and a signal quality detecting circuit for detecting the quality of a reproduction signal, wherein the laser drive circuit controls the recording power so as to satisfy a1<a2, where a1 is the asymmetry of the reproduction signal when a test signal is recorded at a first linear velocity v1, with the erasure power and the recording power varied such that the ratio between these powers is constant, and a2 is the asymmetry of the reproduction signal when the test signal is recorded at a second linear velocity v2 that is higher than the first linear velocity v1, with the erasure power and the recording power varied such that the ratio between these powers is constant.

With these apparatus, a mark can be formed with no distortion at low linear velocities, and a satisfactory power margin can be ensured in recording at high linear velocities, so data can be recorded at good signal quality over a wider range of linear velocities.

With the optical information recording method of the present invention, information can be recorded at good signal quality over a wide range of linear velocities.

Figure 1:
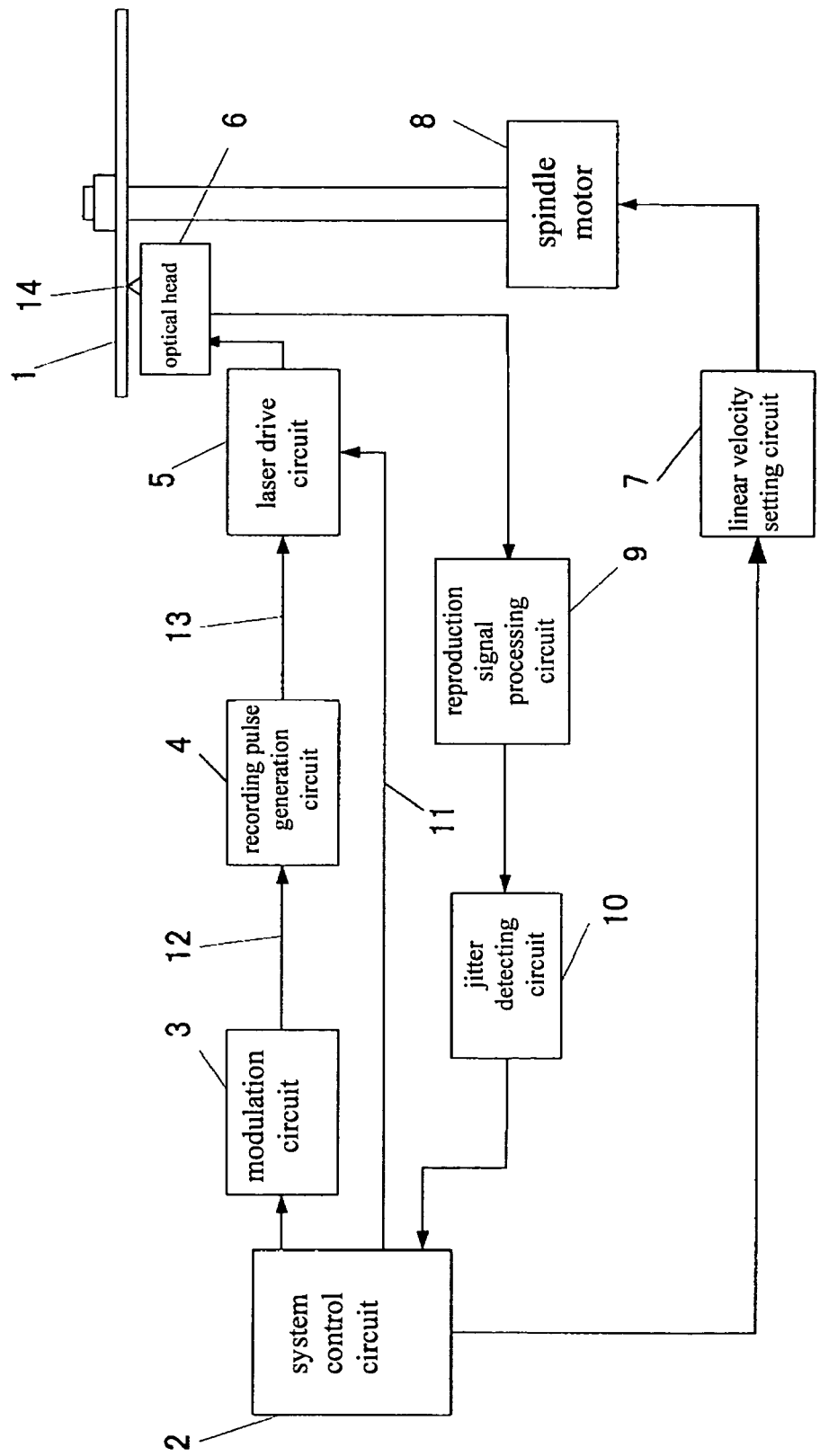
FIG. 1 is a block diagram of the configuration of the recording apparatus pertaining to a first embodiment of the present invention.

NUMERICAL REFERENCES 1 optical disk
2 system control circuit
3 modulation circuit
4 recording pulse generation circuit
5 laser drive circuit
6 optical head
7 linear velocity setting circuit
8 spindle motor
9 reproduction signal processing circuit
10 jitter detecting circuit
11 power setting signal
12 modulation signal
13 recording pulse signal
14 laser beam
301 track
302 mark
303 molten region
304 wall
601 asymmetry detecting circuit
1001 leading pulse
1002 trailing pulse

DETAILED DESCRIPTION OF THE INVENTION

The present invention is described in more detail.

First Embodiment

First, the operation when the recording power is found by performing test recording in the optical information recording method in the first embodiment pertaining to the present invention will be described through reference to FIGS. 1 to 4. The erasure power here is fixed. The quality of the reproduction signal will be described by using jitter in this embodiment.

FIG. 1 is a block diagram of the simplified configuration of the recording apparatus in this embodiment.

1 is an optical disk for recording or reproducing data, and 2 is a system control circuit for controlling the overall recording apparatus. 3 is a modulation circuit for generating a binarized recording data signal according to the information to be recorded, and 4 is a recording pulse generation circuit for generating pulses that drive a laser according to the recording data signal.

5 is a laser drive circuit for modulating current that drives the laser in an optical head 6 according to the pulses outputted by the recording pulse generation circuit. The optical head 6 focuses the laser beam and directs it at the optical disk 1. 7 is a linear velocity setting circuit for controlling the linear velocity (that is, the rotational speed) of the optical disk 1, and 8 is a spindle motor for rotating the optical disk 1. 9 is a reproduction signal processing circuit for performing waveform processing on a reproduction signal based on light reflected from the optical disk 1, and 10 is a circuit for detecting the quality of the reproduction signal, and more specifically, here it is a jitter detecting circuit for obtaining a jitter value.

Next, the operation of the recording apparatus in this embodiment will be described through reference to the flowchart of FIG. 2 and the operational diagrams of FIGS. 3 and 4.

Figure 2:
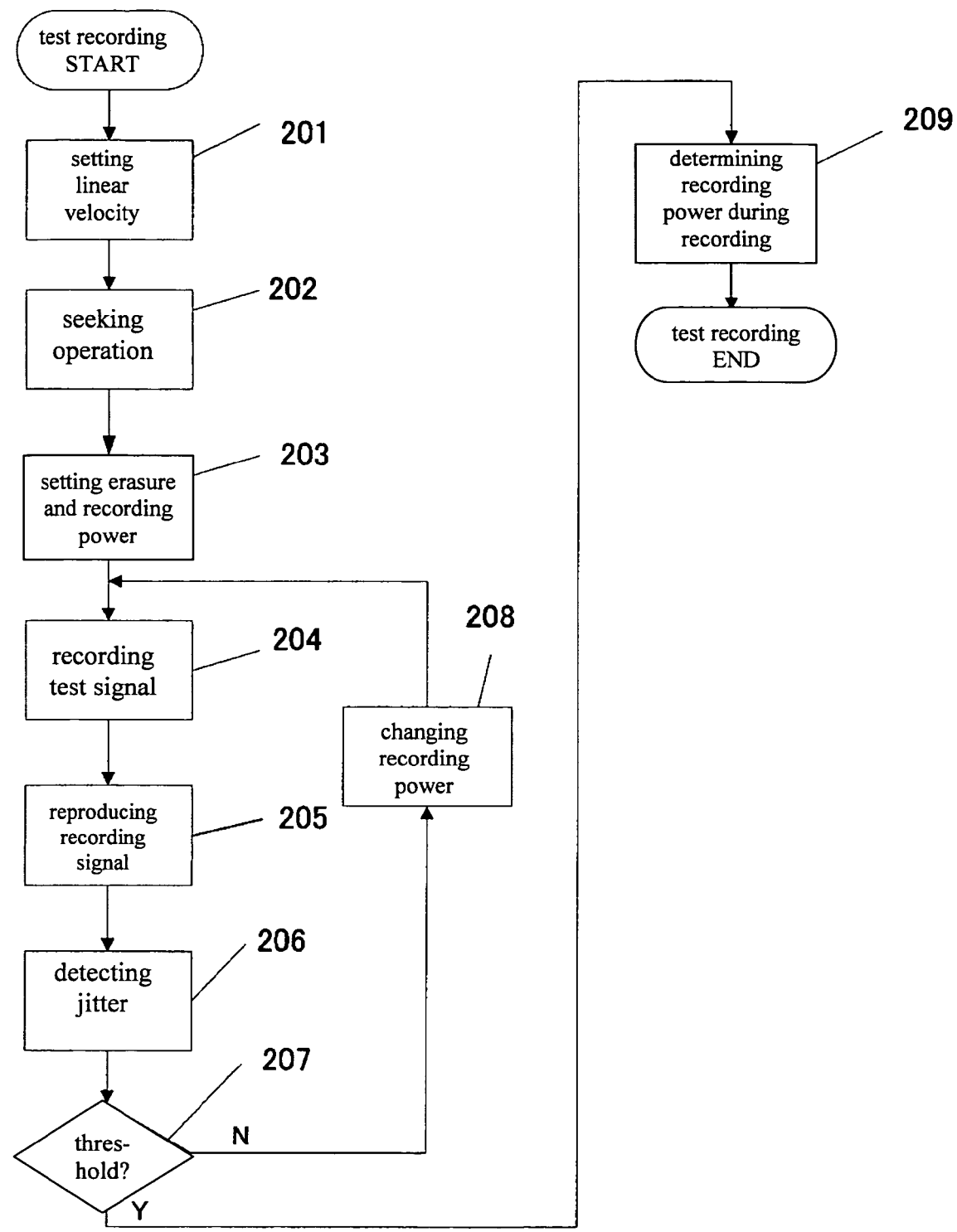
FIG. 2 is a flowchart illustrating the operation of the recording apparatus pertaining to the first embodiment of the present invention.

FIG. 2 is a flowchart illustrating the operation during test recording in this embodiment. FIG. 3 is a graph of jitter and recording power during low linear velocity recording, and a diagram of the state of the recording track, in this embodiment. FIG. 4 is a graph of jitter and recording power during high linear velocity recording, and a diagram of the state of the recording track.

Figure 3:
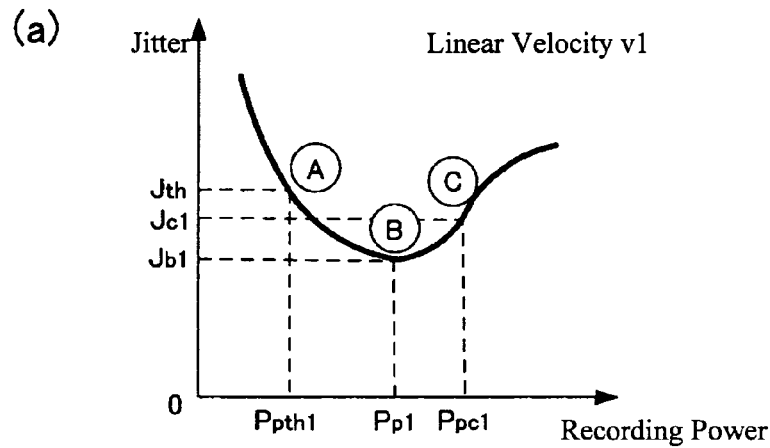
FIG. 3 is a graph of jitter and recording power during low linear velocity recording, and a diagram of the state of the recording track, in the first embodiment.
Figure 4:
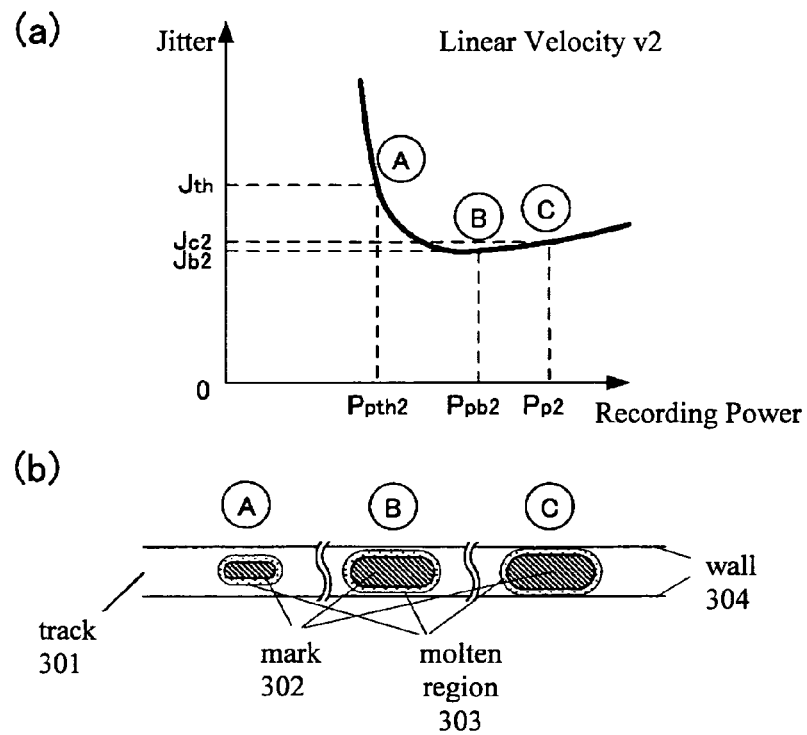
FIG. 4 is a graph of jitter and recording power during high linear velocity recording, and a diagram of the state of the recording track, in the first embodiment.

In FIGS. 3 and 4, (a) is a graph of recording power and jitter, while (b) is the state of recording to the track when the recording power is varied.

During recording, first, in a linear velocity setting step 201 (hereinafter referred to as S201), the linear velocity setting circuit 7 controls the speed of the spindle motor 8 on the basis of a command from the system control circuit 2, causing the optical disk 1 to rotate at a specific linear velocity. In a seek operation step S202, the optical head 6 seeks a specific test recording region on the optical disk 1.

First, we will describe a test recording operation when recording at a low linear velocity v1 (that is, recording at a low transfer rate) in this embodiment.

In a power setting step S203, the system control circuit 2 initializes the recording power and erasure power, and sends a power setting signal to the laser drive circuit 5. These initial values may be stored ahead of time in the recording apparatus. Also, if information expressing the initial power value has been recorded in a control track region of the optical disk 1, the setting may be accomplished by reading this information.

In a test signal recording step S204, test signal information from the system control circuit 2 is modulated by the modulation circuit 3. The modulation circuit 3 modulates according to a specific modulation rule, and sends a modulation signal 12 to the recording pulse generation circuit 4. The recording pulse generation circuit 4 sends a recording pulse signal 13 composed of recording pulses or a recording pulse train to the laser drive circuit 5 on the basis of the modulation signal 12. The laser drive circuit 5 modulates the power level of the laser beam 14, and the laser beam 14 forms a mark corresponding to the test signal on the track.

In a recording signal reproduction step S205, the track in which the test signal was recorded is reproduced. This reproduction signal is subjected to signal processing such as equalization or binarization by the reproduction signal processing circuit 9.

In a jitter detecting step S206, the jitter value of the reproduction signal that has undergone this signal processing is detected.

In a threshold value determination step S207, the system control circuit 2 determines whether or not the detected jitter value is a specific threshold value. The threshold value here is preferably near the value at which the mark begins to be formed, rather than being near the value at which the mark is formed sufficiently large and jitter is at its best. This is because the change in jitter is large with respect to the change in recording power, so the threshold value at which the mark begins to be formed can be clearly detected, without being affected by detection error or variance.

If the jitter value is not equal to the threshold value, then in a recording power change step S208, the recording power is changed by a specific interval, and the flow goes back to the test signal recording step S204. Everything from the test signal recording step S204 through the recording power change step S208 is repeated until the jitter value is sufficiently close to the threshold value.

Once the jitter value becomes sufficiently close to the threshold value, the recording power Pp1 when information is actually recorded is found in a recording power determination step S209. To this end, first, the recording power when the jitter value has become sufficiently close to the threshold value (this is termed Ppth1) is found. Pp1 is calculated as follows from this value.

$$Pp1 = Ppth1 \times C1$$

C1 here is a constant coefficient corresponding to low linear velocity recording.

Test recording for finding the recording power is concluded at this point, and the recording power Pp1 thus found is used to record actual information to the optical disk 1.

The test recording operation when recording at a high linear velocity v2 (that is, recording at a high transfer rate) in this embodiment is basically the same as for the low linear velocity v1 discussed above. What is different from when the linear velocity is low is that the spindle motor 8 is rotated at a high linear velocity in the linear velocity setting step S201, and that a test signal corresponding to a high transfer rate is recorded in the test signal recording step S204, and that in the threshold value determination step S207, the recording power when the jitter value has become sufficiently close to the threshold value (this is termed Ppth2) is found, and the recording power Pp2 is calculated as follows from this value.

$$Pp2 = Ppth2 \times C2$$

C2 here is a constant coefficient corresponding to high linear velocity recording.

It is preferable here for the coefficient C2 during high linear velocity recording to be greater than the coefficient C1 during low linear velocity recording. This will be described through reference to FIGS. 3 and 4.

FIGS. 3 and 4 show how jitter, the molten region, and the mark shape vary as a function of recording power when recording at the low linear velocity v1 and the high linear velocity v2, respectively. FIGS. 3a and 4a show the change in jitter, while FIGS. 3b and 4b show the change in the shape of the molten region 303 and the mark 302 on the track 301.

When recording at the low linear velocity v1, the material melts upon being irradiated with the laser beam, after which recrystallization proceeds from around the edges of the molten region 303. The molten region 303 expands as the recording power is increased from the threshold value Ppth1, but at the same time, the recrystallization region (that is, the portion left over after subtracting the mark 302 from the molten region 303) also expands. Therefore, the extent to which the mark 302 expands as the recording power increases is less than the extent to which the molten region expands. As a result, the jitter value also exhibits a tendency to gradually improve (see the jitter change and the change in recording state from point A to point B in FIG. 3).

However, if the recording power is further increased, the molten region 303 will reach the walls 304 of the track. As a result, because of the fine shape of the walls 304 (causing looseness), recrystallization does not occur in part of the molten region reaching the walls 304, and parts of the mark 302 stick to the walls 304. This causes the jitter value when the recording power has been increased to sharply deteriorate from that point (see the jitter change and the change in recording state from point B to point C in FIG. 3). Consequently, it can be seen that to record at the low linear velocity v1 and a low jitter level, the recording power cannot be set very high with respect to the Ppth1 that is the jitter threshold value.

On the other hand, when recording at the high linear velocity v2, since the relative speed between the laser spot and the medium is high, the material is quenched and readily enters an amorphous state after being melted under irradiation with the laser beam. Specifically, recrystallization does not readily proceed from the edges of the molten region 303, and there is little expansion of the recrystallization region even when the recording power is increased from the threshold value Ppth2. Therefore, when the recording power is increased, the size of the mark 302 increases substantially in proportion to the expansion of the molten region 303. As a result, the jitter value also exhibits a tendency to improve more sharply as compared to recording at the low linear velocity v1 (see the jitter change and the change in recording state from point A to point B in FIG. 4).

Since the recrystallization region does not readily expand in the case of high linear velocity recording, the molten region 303 will not reach the walls 304 even if the mark 302 is made larger by increasing the recording power. Accordingly, there is little worsening in jitter (see the jitter change and the change in recording state from point B to point C in FIG. 4).

What poses a problem in terms of recording information stably at a high linear velocity is not so much the process of melting the recording film and forming a mark, as it is the mechanical properties of the optical disk 1. As discussed above, if there is even a slight axial runout or eccentricity to the disk, the servo that moves the actuator will be unable to keep up with the axial runout or eccentricity, and defocusing or off-tracking will occur as a result. These phenomena lower the effective power applied to the portion where the laser beam is supposed to be directed to form the mark.

In order to record stably and with little jitter even when these phenomena occur in the course of recording at the high linear velocity v2, the recording power setting is preferably set higher than that used at the low linear velocity v1, with respect to the Ppth1 that is the jitter threshold value. In the case of high linear velocity recording, jitter will not worsen as a result of the mark sticking to the walls even when recording at a high recording power. Therefore, it is best to record at an extra-high recording power so that data can be recorded at low jitter even at an effective low power.

As discussed above, the key point of this embodiment is that the ratio of recording power to the power that is the jitter threshold value is relatively low at low linear velocities, and is relatively large at high linear velocities. Specifically, (Pp1/Ppth1)<(Pp2/Ppth2) is satisfied.

This minimizes the sticking of the mark to the walls in low linear velocity recording, so the mark is formed with no distortion. Along with this, there is an additional effect whereby stable recording is possible without any worsening of jitter even if defocusing or off-tracking should occur as a result of axial runout or eccentricity at a high linear velocity, so information can be recorded at good signal quality over a wider range of linear velocities.

In this embodiment, jitter in the reproduction signal was detected by the jitter detecting circuit 10, but an error rate detecting circuit may be provided instead of the jitter detecting circuit 10, and the recording power when information is recorded may be found from the recording power that is the error rate threshold value. With a typical recording apparatus, the function of detecting the error rate is handled by a circuit that demodulates information from the reproduction signal, so an advantage is that there is no need to add any special circuits.

Figure 5:
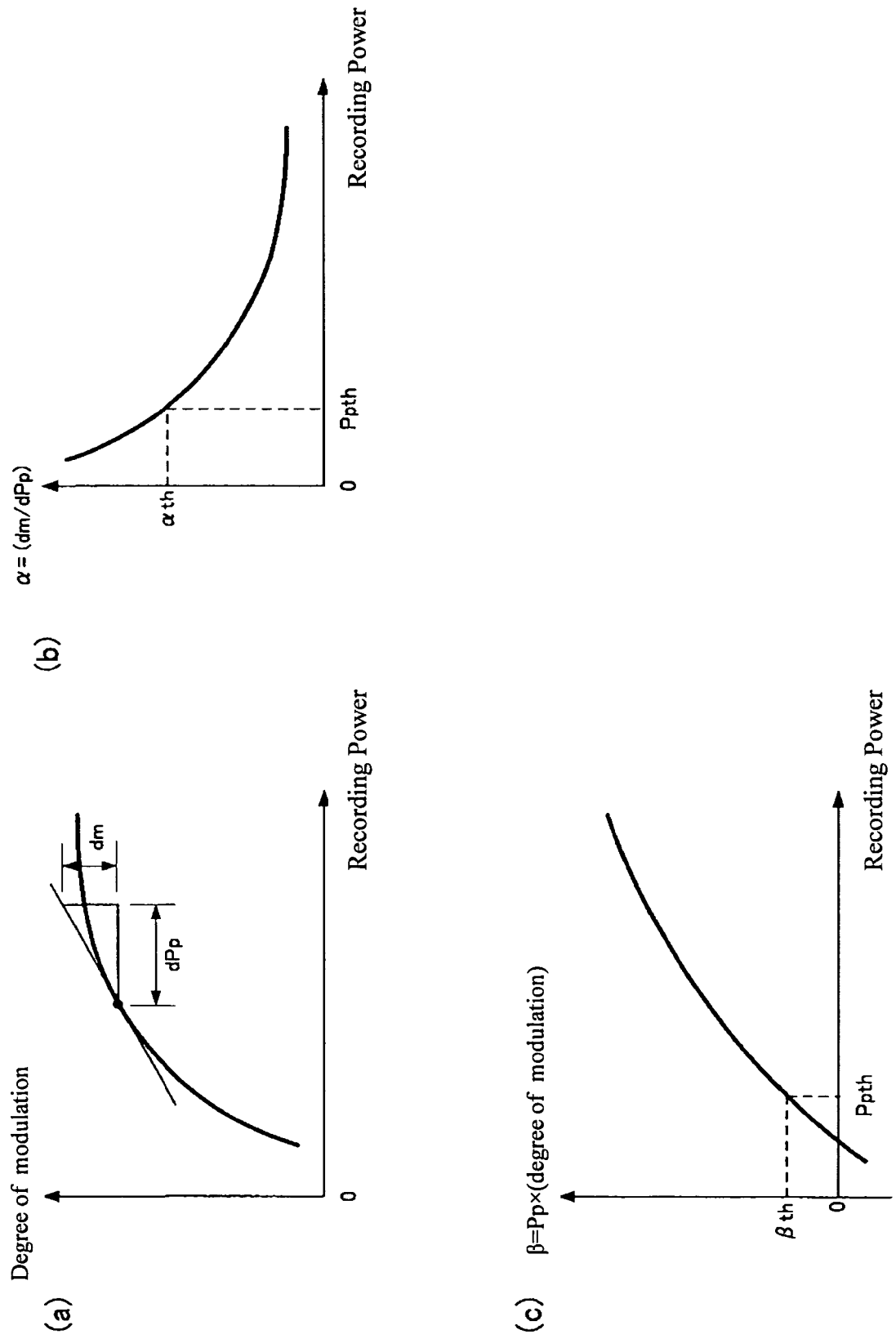
FIG. 5 consists of graphs illustrating examples of the method for finding the threshold value from the degree of modulation in the first embodiment.

Also, a modulation detecting circuit may be provided instead of the jitter detecting circuit 10, and the recording power when information is recorded may be found from the recording power that is the modulation threshold value. In addition to a method in which the absolute value of the degree of modulation is used as the threshold value for the degree of modulation here, a method in which the differential coefficient of (degree of modulation/recording power) is used as the threshold value may be employed. Specifically, as shown in FIG. 5$a$, the differential coefficient of (degree of modulation/recording power) $\alpha m=dm/dPp$ is found. As shown in FIG. 5$b$, the change in am when the recording power is varied is found, and the recording power at which am reaches a threshold value $\alpha$th is termed Ppth1 or Ppth2. Again with this method, the threshold value can be found accurately.

Another mode in which a value based on the degree of modulation is used as a threshold value is shown in FIG. 5$c$, in which the value of (degree of modulation×recording power) is termed $\beta$, and the $\beta$ when the recording power is varied is found, which allows the threshold value to be found accurately even when the recording power at which $\beta$ is the threshold value $\beta$th is found at various linear velocities.

In addition to the above, as long as it is possible to find the recording power Ppth1 or Ppth2 at which a mark of a specific size begins to be formed at various linear velocities, then any method in which a threshold value is used can be applied to the present invention.

Second Embodiment

Next, the configuration of the recording apparatus in FIG. 6 will be described, as will the operation of the recording apparatus of the second embodiment pertaining to the present invention, through reference to the flowchart of FIG. 7.

Figure 6:
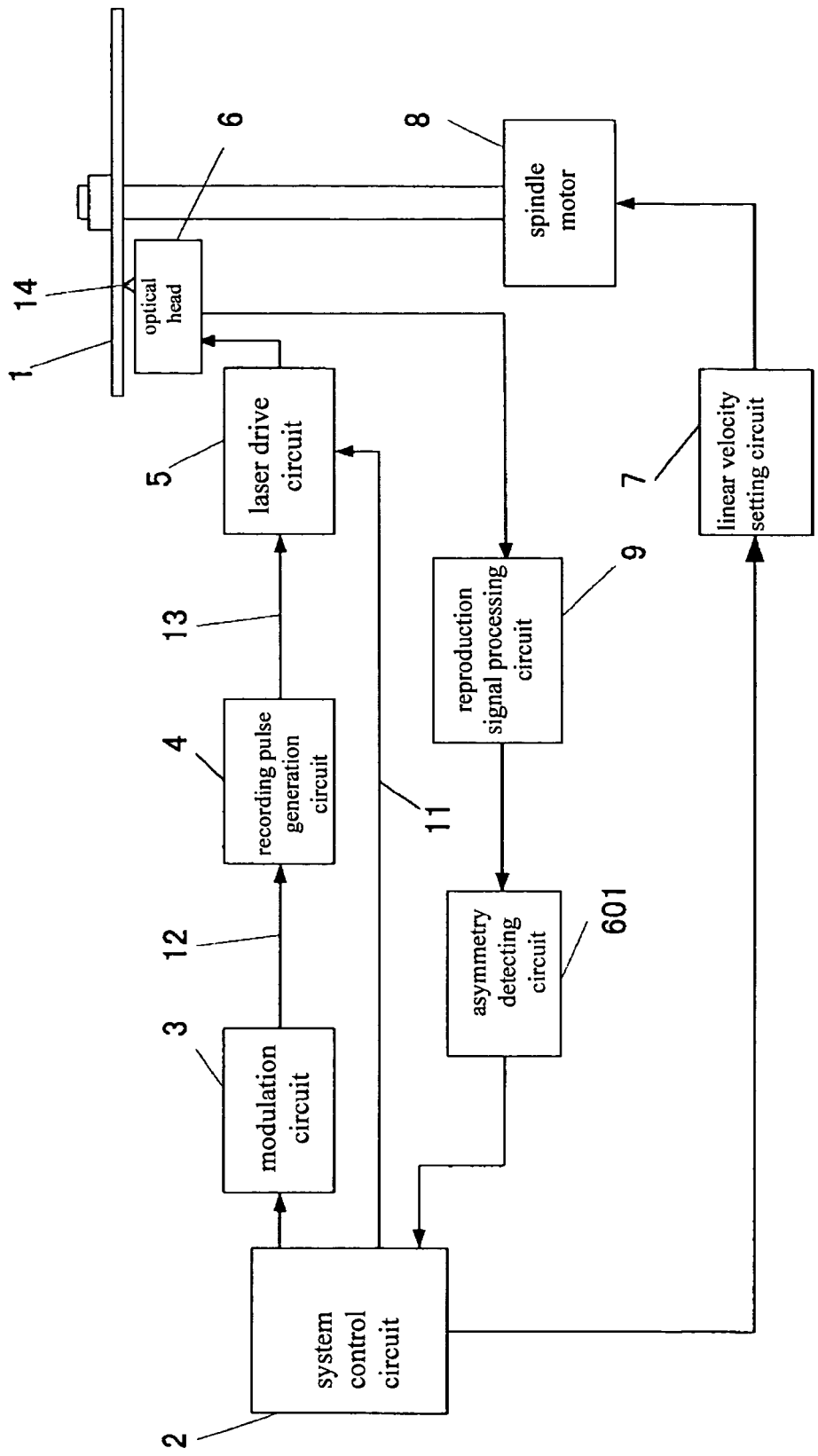
FIG. 6 is a block diagram of the configuration of the recording apparatus pertaining to a second embodiment of the present invention.

FIG. 6 is a block diagram of the simplified configuration of the recording apparatus in this embodiment. What is different from the first embodiment is that an asymmetry detecting circuit 601 is provided instead of the jitter detecting circuit 10.

Figure 7:
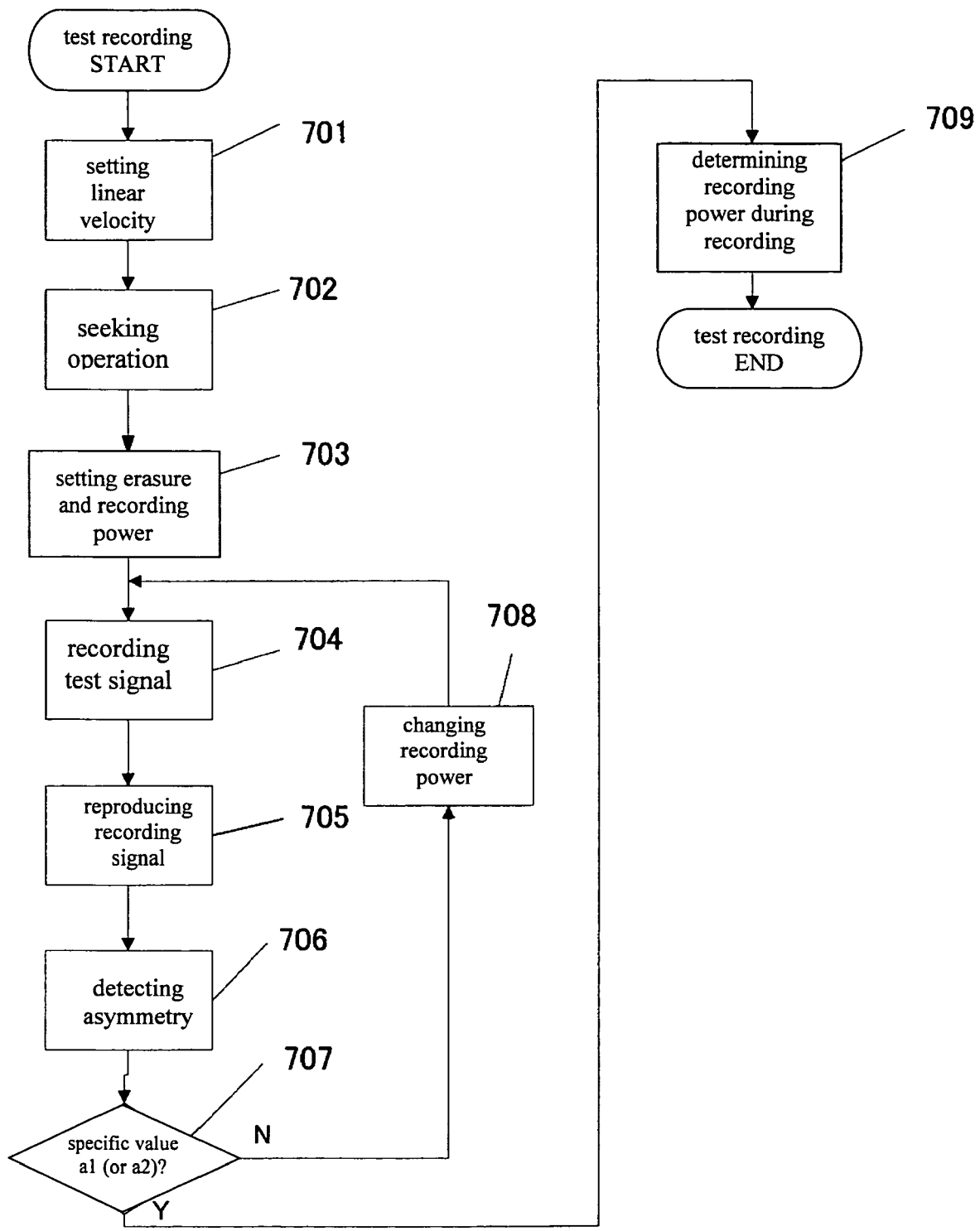
FIG. 7 is a flowchart illustrating the operation of the recording apparatus pertaining to the second embodiment of the present invention.

FIG. 7 is a flowchart illustrating the operation during test recording in this embodiment.

Figure 8:
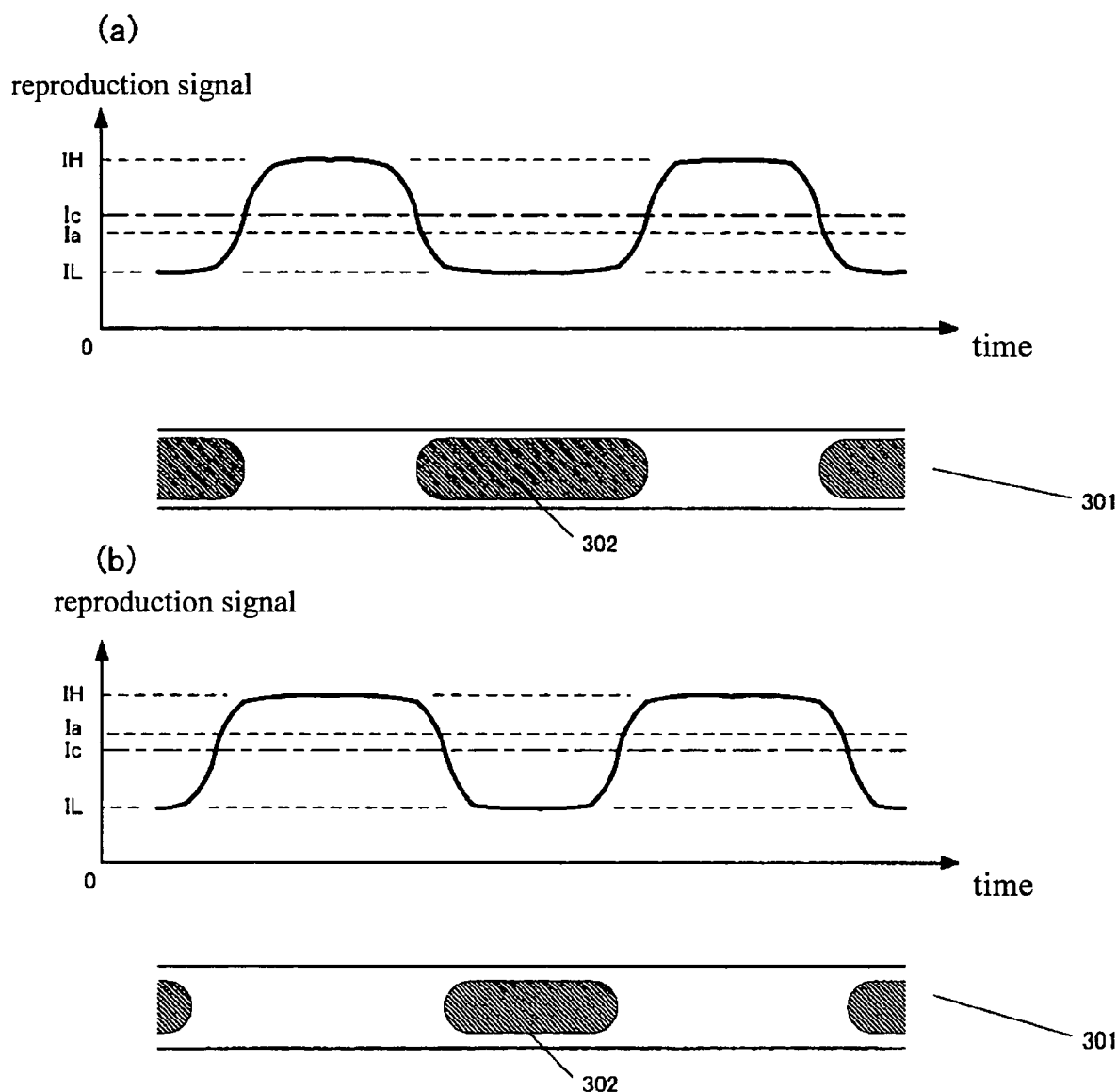
FIG. 8 consists of waveform diagrams and diagrams illustrating an example of recording a mark by modulating the laser beam in low linear velocity recording.

Everything from the start of the test recording up to the recording signal reproduction step S705 is the same as in the first embodiment. What is different is that in an asymmetry detecting step S706, the asymmetry detecting circuit 601 detects the asymmetry of the reproduction signal. How this asymmetry is found will be described through reference to FIG. 8. FIGS. 8$a$ and 8$b$ show the reproduction waveforms and the state of recording on the track, when the asymmetry is large and small, respectively. If we let IH be a high level of reproduction signal amplitude, IL a low level, Ic a central level, and Ia the average level, the asymmetry a can be found from the following equation.

$$a=(Ic-Ia)/(IH-IL)$$

Specifically, asymmetry becomes greater as the mark becomes longer (larger).

Let us term the asymmetry at the low linear velocity v1 as the specific value a1, and the asymmetry at the high linear velocity v2 as the specific value a2. The value of a2 here must be greater than that of a1. The procedure from the test recording step S704 to the recording power change step S708 is repeated to find the recording power at which the asymmetry is a1 at the low linear velocity v1.

In a recording power determination step S709, the recording power Pp1 when information is actually recorded is the recording power at the asymmetry a1. This concludes the test recording for finding the recording power at a low linear velocity.

Similarly, in the case of the high linear velocity v2, the recording power Pp2 at the asymmetry a2 is found, and this power is termed the recording power when information is actually recorded.

Thus, the asymmetry of a reproduction signal is made relatively small at a low linear velocity and relatively large at a high linear velocity. Just as in the first embodiment, this minimizes the sticking of the mark to the walls in low linear velocity recording, so the mark is formed with no distortion, and stable recording is possible without any worsening of jitter even if defocusing or off-tracking should occur as a result of axial runout or eccentricity at a high linear velocity. This means that information can be recorded at good signal quality over a wider range of linear velocities.

Other Embodiments

In the above embodiments, the erasure power was fixed and the recording power was varied, but the same effect as above can also be achieved by obtaining a threshold value by varying erasure power and recording power with the ratio thereof held constant.

Also, in the above embodiments, the recording power at v1 and v2 was determined by test recording, but if the respective recording powers Pp1 and Pp2 at v1 and v2, or the respective coefficients C1 and C2, or the respective asymmetries a1 and a2 are prerecorded in a control track of the medium (that is, a region in which information related to the medium is recorded), an advantage is that the recording power suited to the linear velocity can be determined as soon as the medium is installed in the optical information recording apparatus. This power level information may be recorded to the medium by the optical information recording apparatus, or it may already have been recorded during the manufacture of the medium.

The medium in the above embodiments is preferably such that the recording film is composed of a phase changing material, and contains germanium and tellurium, and also contains either tin or bismuth. An advantage in this case is that there is less incomplete erasure during overwriting in recording at a high linear velocity, so data can be recorded at even better signal quality.

Further, the medium in the above embodiments is preferably such that the track of the medium is divided into a plurality of sectors, has embossed tracks between the sectors, and the center of the embossed tracks is shifted from the center of the recording tracks of the sectors. An advantage in this case is that stable recording is possible even if off-tracking occurs as a result of actuator oscillation at the boundary between a recording track and an embossed track during recording at a high linear velocity.

The above embodiments may involve recording to a CAV recording type of medium.

Furthermore, the above embodiments involved two types of recording, namely, at a low linear velocity v1 and a high linear velocity v2, but with a CAV recording system, the linear velocity and transfer rate continuously vary with the recording or reproduction position in the medium. In such a case, it is preferable to adopt a method in which the recording power is easily determined at an intermediate linear velocity by linking, either smoothly or in steps, the recording power at the low linear velocity v1 and the recording power at the high linear velocity v2. More specifically, for example, the recording power may be determined at an intermediate linear velocity so that the recording power increases along with the intermediate linear velocity.

In the above embodiments, it is preferable if the power level between recording pulses is controlled to be different from the erasure power. In this case, the cooling rate during recording can be optimally controlled according to the linear velocity, so data can be recorded at good signal quality.

Furthermore, in the above embodiments, the power level of the laser irradiation waveform was varied between two levels, namely, the recording power Pp and the erasure power Pb, but may instead be varied between three or more levels. For instance, the power level between recording pulses (also called the bottom level) may be higher than Pb, or may be lower than Pb. Here, when the power coefficient between recording pulses is $\alpha$ and $\alpha=(Pbtm-Pb)/(Pp-Pb)$, where Pp is the recording power, Pb is the erasure power, and Pbtm is the power level between recording pulses, setting the power coefficient between recording pulses so as to increase in proportion to the linear velocity is preferable in that the cooling rate during recording at a high linear velocity will not be excessive, and there will be little incomplete erasure during overwriting.

Also, the same effect as in the above embodiments will be obtained if a recording pulse train to which cooling pulses have been added is formed after the recording pulses or recording pulse train.

Further, the above-mentioned modulation method, the length and position of the pulses, and so forth are not limited to those given in the embodiments, and can be suitably set according to the medium and the recording conditions. Also, the edge position of the recording pulses may be corrected in order to avoid the effect of thermal interference between marks.

Also, the above-mentioned optical disk may be made of a phase changing material, an opto-magnetic material, a colorant material, or the like, any of which can be used in the present invention as long as it is a medium whose optical characteristics of the marks and spaces are different from those of the spaces.

Moreover, the same effect as above can be obtained with a personal computer, a server, a recorder, or the like in which the optical information recording method, the optical information recording apparatus, or the optical information recording medium of the present invention is used.

Working Examples

More specific working examples of the first embodiment of the present invention will now be described.

A polycarbonate resin with a diameter of 120 mm and a thickness of 0.6 mm was used for the substrate of the optical disk 1. This substrate was preformatted by forming convex and concave pits as a control track region.

Information expressing the recording linear velocity for the disk was recorded as an indentifier in the control track region. In this working example, the disk could be used for recording at a linear velocity ranging from 24.6 to 65.6 m/s.

A recording guide groove was formed in the data region of the resin substrate. The guide groove had a pitch of 0.6 μm. As to the structure in which the sectors are provided within the data region, pits expressing address information may be formed between sectors.

Four layers comprising a protective film, a recording film, another protective film, and a reflective film were formed by sputtering over the substrate, and a protective substrate was bonded over these. The protective films were ZnS—SiO$_2$, the recording film was GeSbBiTe, and the reflective film was aluminum.

The radial position of the data region ranged from 21.9 to 58.4 mm, and test recording regions were provided at two locations, namely, on the inside and outside of the data region. Specifically, the radial position of the test recording regions ranged from 21.8 to 21.9 mm and from 58.4 to 58.5 mm.

When this disk was rotated at a constant speed of 10,727 rpm (that is, equal rotation speed), recording or reproduction was performed at a linear velocity of 24.6 m/s at the innermost part of the data region (that is, at a radius of 21.9 mm), and at a linear velocity of 65.6 m/s at the outermost part (that is, at a radius of 58.4 mm).

With a CAV recording system, recording is performed with the linear density held constant by varying the channel clock period according to the change in linear velocity from the inner to outer periphery. In this working example, the information modulation system was (8-16) pulse width modulation, and the channel clock period was set so that the shortest mark length would be 0.40 μm.

First, the disk was rotated at a linear velocity of 24.6 m/s, the focus and tracking servos were actuated, and the focus error signal was observed, but no pronounced fluctuation was seen. The maximum residual error of the focus error signal was measured and converted into the amount of movement in the optical axis direction of the actuator, which gave a result of 0.1 μm (zero-peak amplitude).

The disk was then rotated at 65.6 m/s, whereupon there were local instances of spiking of the focus error signal. The maximum residual error of the local spiking was 1.2 μm. The length of this local spiking was approximately one-tenth of a rotation in the track direction, no pronounced fluctuations were seen anywhere else, and the maximum residual error was 0.2 μm.

A place on the disk where there was no spiking of the focus error signal remainder was selected, and the relation between recording power and jitter was measured at a minimum linear velocity of 24.6 m/s and a maximum linear velocity of 65.6 m/s, with the erasure power fixed and the recording power varied. The erasure power here was 8 mW at 24.6 m/s, and 11 mW at 65.6 m/s.

Figure 9A:
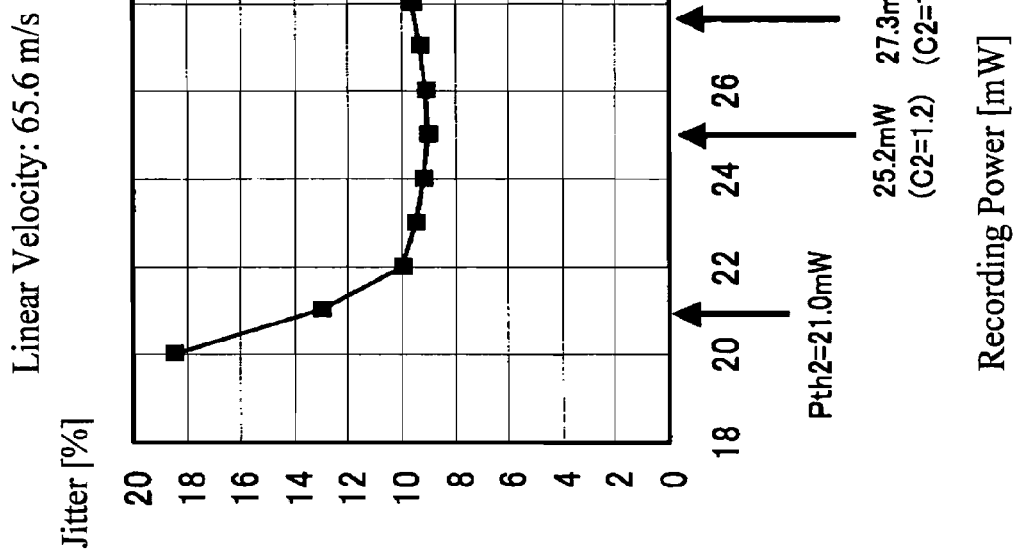
FIG. 9 consists of graphs of jitter and recording power in a working example of the present invention.
Figure 9B:
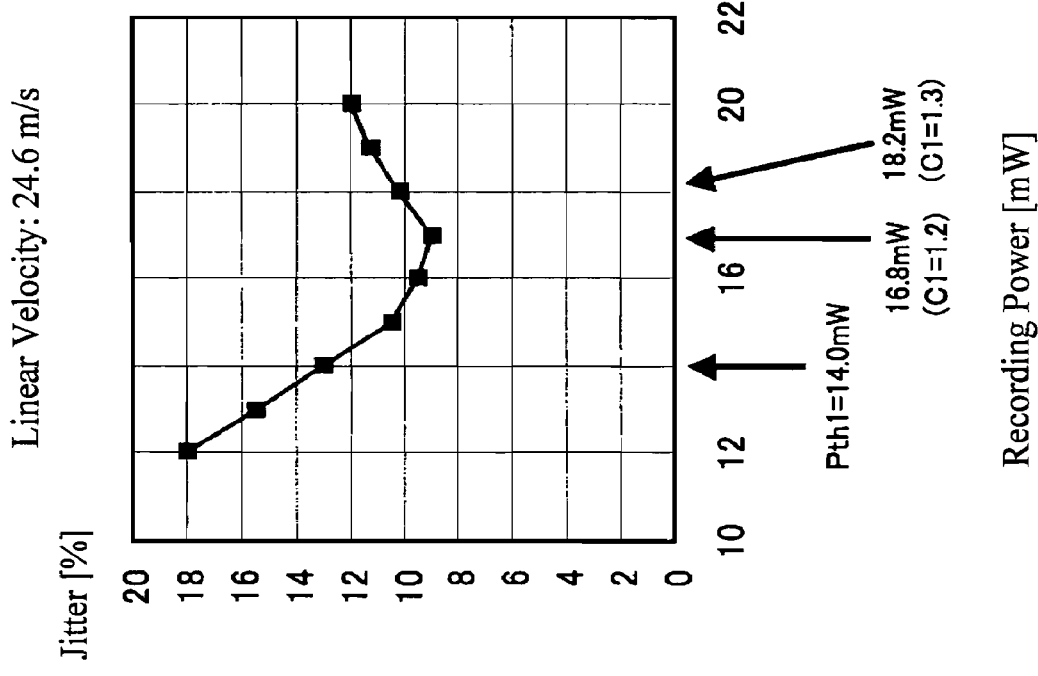

These measurement results are given in FIG. 9. FIG. 9a shows the results of measurement at a linear velocity of 24.6 s/m, and FIG. 9b shows the results of measurement at a linear velocity of 65.6 m/s. If we assume the jitter threshold value to be 13%, the recording power at which the threshold value is attained was 14 mW at 24.6 m/s and 21 mW at 65.6 m/s. The recording power jitter when the coefficient C1 or C2 was 1.2, the recording power when the coefficient was 1.3, and the jitter were found on the basis of these power levels, the results of which are given in Tables 1 and 2.

TABLE 1

| linear velocity: 24.6 m/s | | |
|---|---|---|
| | Recording power (mW) | Jitter (%) |
| C1 = 1.2 | 16.8 | 9.2 |
| C1 = 1.3 | 18.2 | 10.5 |

TABLE 2

| linear velocity: 65.6 m/s | | |
|---|---|---|
| | Recording power (mW) | Jitter (%) |
| C2 = 1.2 | 25.2 | 9.1 |
| C2 = 1.3 | 27.3 | 9.4 |

It can be seen from these tables that jitter worsens sharply at C1=1.3 as compared to when C1=1.2 at a linear velocity of 24.6 m/s. Meanwhile, at a linear velocity of 65.6 m/s, there was little worsening in jitter when C2 was raised from 1.2 to 1.3.

Figure 9C:
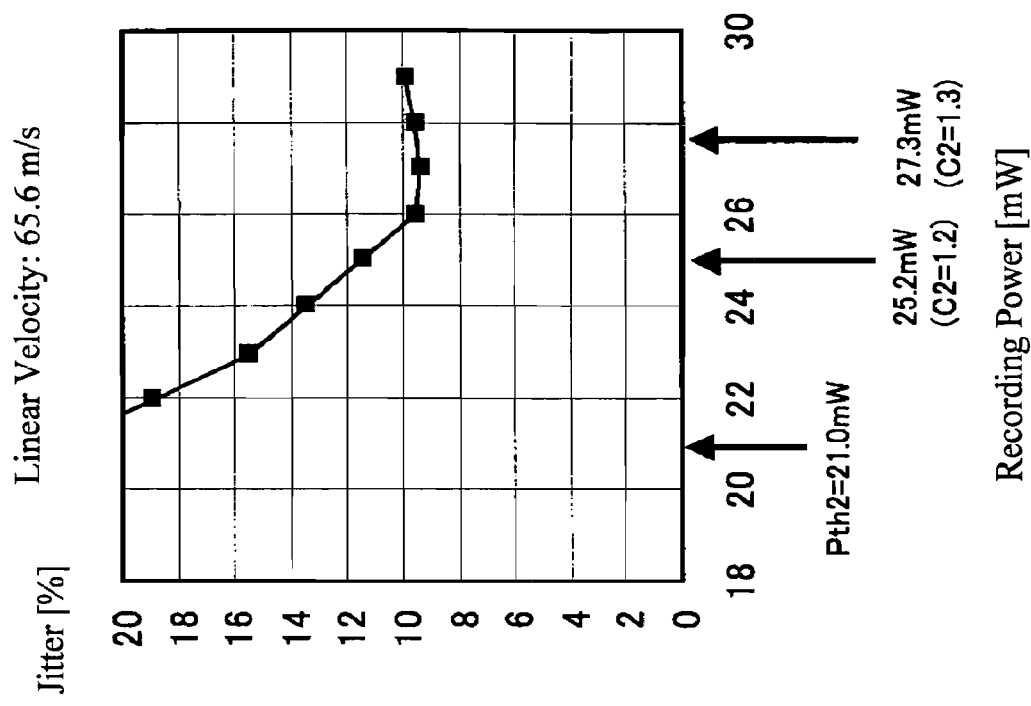
Figure 10:
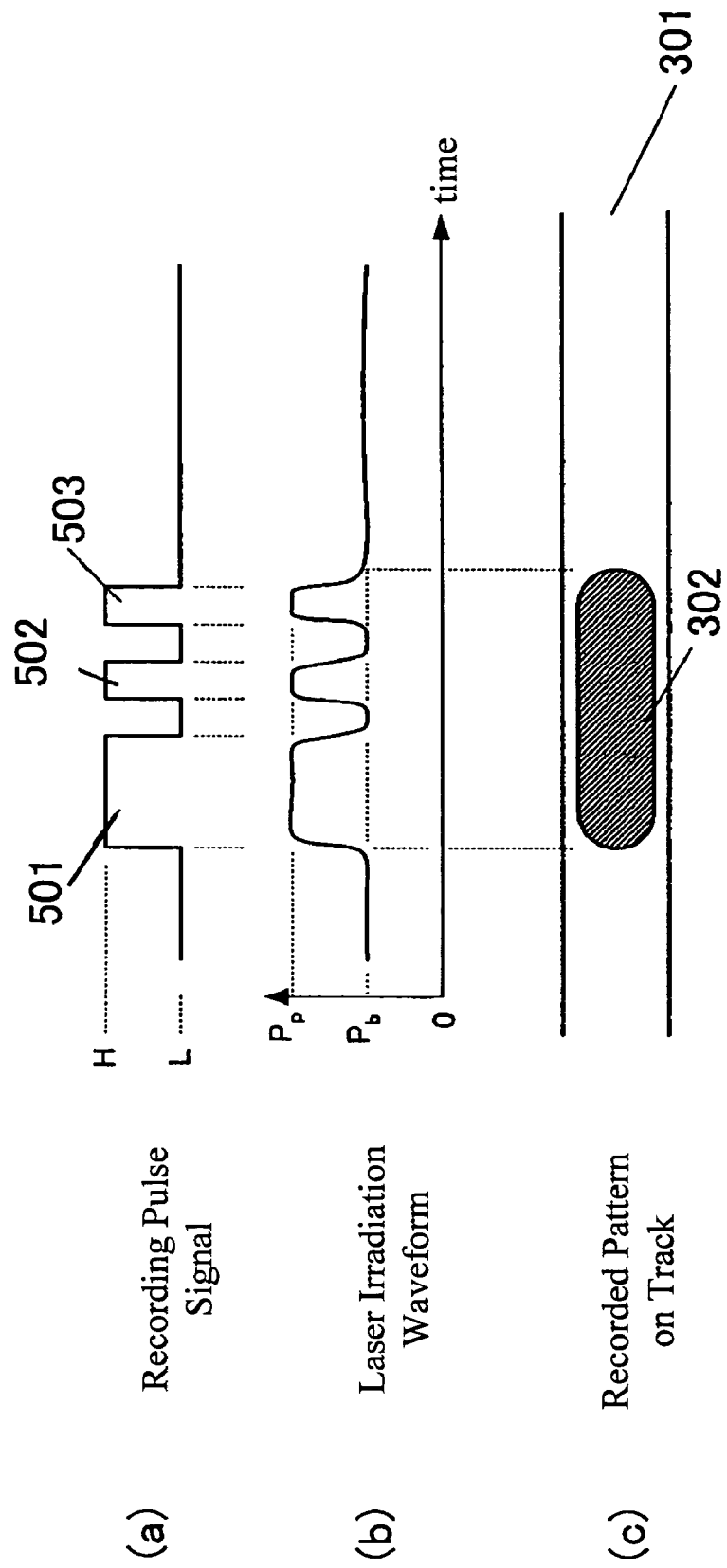
FIG. 10 consists of diagrams of the recording pulse signal, the laser irradiation waveform, and the recording state in a conventional example.
Figure 11:
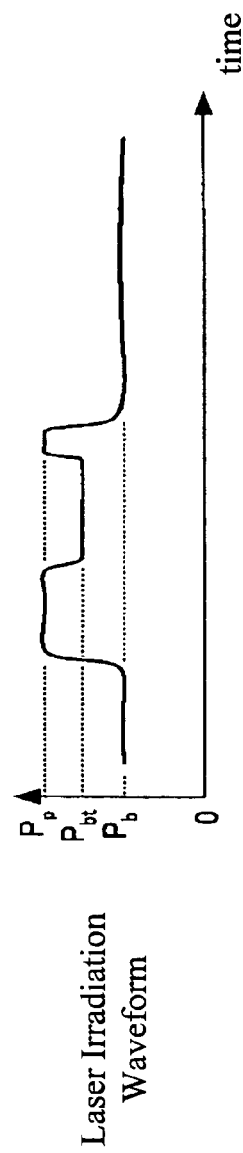
FIG. 11 is a diagram of another example of the laser irradiation waveform in a conventional example.
Figure 12:
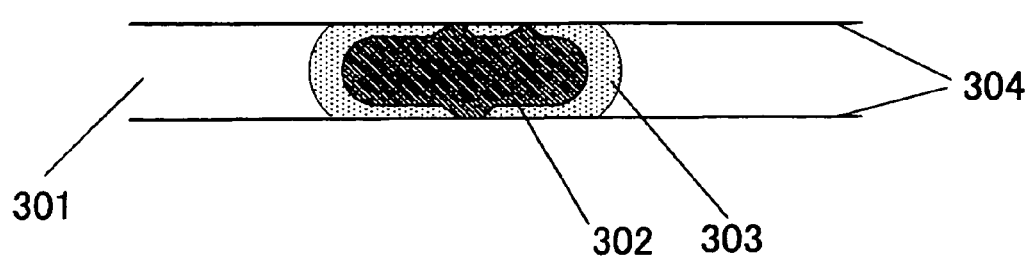
FIG. 12 is a diagram of the mark distortion during low linear velocity recording in a conventional example.

Next, only a place where there was no spiking of the focus error signal was selected, and the jitter was measured when data was recorded at recording power levels of C2=1.2 and 1.3. These results are given in Table 3. FIG. 9c shows the results of measuring the relation between recording power and jitter.

TABLE 3

| linear velocity: 65.6 m/s | | |
|---|---|---|
| | Recording power (mW) | Jitter (%) |
| C2 = 1.2 | 25.2 | 11.2 |
| C2 = 1.3 | 27.3 | 9.4 |

The jitter above was the same as in Table 2 when C2=1.3, but was worse when C2=1.2. The reproduction signal of the track recorded at C2=1.2 was observed, and the signal amplitude had decreased at the same places where the focus error signal was locally spiked. This seems to indicate that jitter worsened at C2=1.2, at which there was no margin for error when the power was decreased, because there was an effective decrease in the irradiation energy at the places where defocusing had occurred locally.

It can be seen from the above that with this disk, stable recording at low jitter can be performed, at either the lowest or the highest linear velocity, by setting C1 to 1.2 at a linear velocity of 24.6 m/s and C2 to 1.3 at a linear velocity of 65.6 m/s (that is, setting to C1<C2).

Also, the reproduction signal of this disk was demodulated and the bit error rate of the data was measured. The correlation between jitter and the bit error rate was found, which revealed that no bit error occurred when the jitter was 9.5% or lower.

This tells us that reproduction at higher quality is possible within the C1 and C2 ranges, in which jitter is 9.5% or less, so these ranges are preferable. The results in FIG. 9a indicate that these ranges are 1.14≦C1≦1.24 at a linear velocity of 24.6 m/s, and 1.25≦C2≦1.33 at a linear velocity of 65.6 m/s.

INDUSTRIAL APPLICABILITY

The optical information recording method, optical information recording apparatus, and optical information recording medium of the present invention can also be applied to a personal computer, a server, a recorder, or the like, and the same effect as above can be obtained.

The invention claimed is:
1. An optical information recording method comprising:
    irradiating an optical information recording medium with a laser beam;
    forming at least one of marks and spaces to vary optical characteristics of a recording film of the optical information recording medium;

forming the marks by at least one of recording pulses in which a power of the laser beam is switched between a plurality of power levels including at least a recording power and an erasure power, and recording a recording pulse train in which the power of the laser beam is switched between the plurality of power levels; and recording information to the optical information recording medium at two different linear velocities, wherein the recording power is controlled so as to satisfy ($Pp1/Ppth1$)<($Pp2/Ppth2$), where (i) $Ppth1$ is a threshold value of the recording power at which a quality of a reproduction signal drops under a specific value, when a test signal is recorded at a first linear velocity $v1$, with the erasure power fixed and the recording power varied, (ii) $Ppth2$ is the threshold value of the recording power at which the quality of the reproduction signal drops under a specific value, when the test signal is recorded at a second linear velocity $v2$ that is higher than the first linear velocity $v1$, with the erasure power fixed and the recording power varied, (iii) $Pp1$ is the recording power, when the information is recorded at the first linear velocity $v1$, and (iv) $Pp2$ is the recording power, when the information is recorded at the second linear velocity $v2$.

2. The optical information recording method according to claim 1, wherein a criterion for the quality of the reproduction signal is a jitter of the reproduction signal.

3. The optical information recording method according to claim 1, wherein a criterion for the quality of the reproduction signal is a value based on an error rate of the reproduction signal.

4. The optical information recording method according to claim 1, wherein a criterion for the quality of the reproduction signal is a value based on a degree of modulation of the reproduction signal.

5. The optical information recording method according to claim 1, wherein the optical information recording method is performed by a recording system that is a CAV recording system.

6. The optical information recording method according to claim 1, wherein the recording power is controlled so that $Pp$ is increased according to an increase in a linear velocity $v$, when $Pp$ is the recording power at the linear velocity $v$, which is a value between the first linear velocity $v1$ and the second linear velocity $v2$.

7. The optical information recording method according to claim 1, wherein the power level between recording pulses is controlled to be different from the erasure power.

8. The optical information recording method according to claim 1, wherein a power coefficient between recording pulses at the second linear velocity $v2$ is controlled to be higher than the power coefficient between recording pulses at the first linear velocity $v1$, when the power coefficient between recording pulses is $\alpha$ and $\alpha=(Pbtm-Pb)/(Pp-Pb)$, where $Pp$ is the recording power, $Pb$ is the erasure power, and $Pbtm$ is the power level between recording pulses.

9. An optical information recording medium with which information is recorded by the method according to claim 1, wherein information expressing the value of $Pp1/Ppth1$ and $Pp2/Ppth2$ is recorded.

10. An optical information recording medium with which information is recorded by the method according to claim 1, wherein information expressing the value of $Pp1$ and $Pp2$ is recorded.

11. The optical information recording medium according to claim 10, wherein the recording film is composed of a phase changing material, and the phase changing material contains germanium and tellurium, and also contains either tin or bismuth.

12. The optical information recording medium according to claim 10, having a track divided into a plurality of sectors and having embossed tracks between the plurality of sectors, the embossed tracks being formed such that a center of the embossed tracks is shifted from a center of recording tracks of the plurality of sectors.

13. An optical information recording method comprising:
irradiating an optical information recording medium with a laser beam;
forming at least one of marks and spaces to vary optical characteristics of a recording film of the optical information recording medium;
forming the marks by at least one of recording pulses in which a power of the laser beam is switched between a plurality of power levels including at least a recording power and an erasure power, and recording a recording pulse train in which the power of the laser beam is switched between the plurality of power levels; and
recording information to the optical information recording medium at two different linear velocities,
wherein the recording power is controlled so as to satisfy ($Pp1/Ppth1$)<($Pp2/Ppth2$), where (i) $Ppth1$ is a threshold value of the recording power at which a quality of a reproduction signal drops under a specific value, when a test signal is recorded at a first linear velocity $v1$, with the erasure power and the recording power varied such that a ratio between the erasure power and the recording power is constant, (ii) $Ppth2$ is a threshold value of the recording power at which the quality of the reproduction signal drops under a specific value, when the test signal is recorded at a second linear velocity $v2$ that is higher than the first linear velocity $v1$, with the erasure power and the recording power varied such that the ratio between the erasure power and the recording power is constant, (iii) $Pp1$ is the recording power, when the information is recorded at the first linear velocity $v1$, and (iv) $Pp2$ is the recording power, when the information is recorded at the second linear velocity $v2$.

14. An optical information recording medium with which information is recorded by the method according to claim 13, wherein information expressing the value of $Pp1/Ppth1$ and $Pp2/Ppth2$ is recorded.

15. The optical information recording medium according to claim 9, wherein the recording film is composed of a phase changing material, and the phase changing material contains germanium and tellurium, and also contains either tin or bismuth.

16. The optical information recording medium according to claim 15, having a track divided into a plurality of sectors and having embossed tracks between the plurality of sectors, the embossed tracks being formed such that a center of the embossed tracks is shifted from a center of recording tracks of the plurality of sectors.

17. The optical information recording medium according to claim 9, having a track divided into a plurality of sectors and having embossed tracks between the plurality of sectors, the embossed tracks being formed such that a center of the embossed tracks is shifted from a center of recording tracks of the plurality of sectors.

18. An optical information recording medium with which information is recorded by the method according to claim 13, wherein information expressing the value of $Pp1$ and $Pp2$ is recorded.

19. An optical information recording method comprising:
irradiating an optical information recording medium with a laser beam;
forming at least one of marks and spaces to vary optical characteristics of a recording film of the optical information recording medium;
forming the marks by at least one of recording pulses in which a power of the laser beam is switched between a plurality of power levels including at least a recording power and an erasure power, and recording a recording pulse train in which the power of the laser beam is switched between the plurality of power levels; and
recording information to the optical information recording medium at two different linear velocities,
wherein the recording power is controlled so as to satisfy a1<a2, where (i) a1 is an asymmetry of a reproduction signal, when a test signal is recorded at a first linear velocity v1, with the erasure power fixed and the recording power varied, and (ii) a2 is the asymmetry of the reproduction signal, when the test signal is recorded at a second linear velocity v2 that is higher than the first linear velocity v1, with the erasure power fixed and the recording power varied.

20. The optical information recording method according to claim 19, wherein the recording power is controlled so that Pp is increased according to an increase in a linear velocity v, when Pp is the recording power at the linear velocity v, which is a value between the first linear velocity v1 and the second linear velocity v2.

21. The optical information recording method according to claim 19, wherein the power level between recording pulses is controlled to be different from the erasure power.

22. The optical information recording method according to claim 19, wherein a power coefficient between recording pulses at the second linear velocity v2 is controlled to be higher than the power coefficient between recording pulses at the first linear velocity v1, when the power coefficient between recording pulses is α and α=(Pbtm−Pb)/(Pp−Pb), where Pp is the recording power, Pb is the erasure power, and Pbtm is the power level between recording pulses.

23. An optical information recording medium with which information is recorded by the method according to claim 19, wherein information expressing the value of a1 and a2 is recorded.

24. The optical information recording medium according to claim 23, wherein the recording film is composed of a phase changing material, and the phase changing material contains germanium and tellurium, and also contains either tin or bismuth.

25. The optical information recording medium according to claim 23, having a track divided into a plurality of sectors and having embossed tracks between the plurality of sectors, the embossed tracks being formed such that a center of the embossed tracks is shifted from a center of recording tracks of the plurality of sectors.

26. An optical information recording method comprising:
irradiating an optical information recording medium with a laser beam;
forming at least one of marks and spaces to vary optical characteristics of a recording film of the optical information recording medium;
forming the marks by at least one of recording pulses in which a power of the laser beam is switched between a plurality of power levels including at least a recording power and an erasure power, and recording a recording pulse train in which the power of the laser beam is switched between the plurality of power levels; and
recording information to the optical information recording medium at two different linear velocities,
wherein the recording power is controlled so as to satisfy a1<a2, where (i) a1 is an asymmetry of a reproduction signal, when a test signal is recorded at a first linear velocity v1, with the erasure power and the recording power varied such that a ratio between the erasure power and the recording power is constant, and (ii) a2 is the asymmetry of the reproduction signal, when the test signal is recorded at a second linear velocity v2 that is higher than the first linear velocity v1, with the erasure power and the recording power varied such that the ratio between the erasure power and the recording power is constant.

27. An optical information recording medium with which information is recorded by the method according to claim 26, wherein information expressing the value of a1 and a2 is recorded.

28. An optical information recording apparatus for irradiating an optical information recording medium with a laser beam, forming at least one of marks and spaces to vary optical characteristics of a recording film of the optical information recording medium, forming the marks by at least one of recording pulses in which a power of the laser beam is switched between a plurality of power levels including at least a recording power and an erasure power, and recording a recording pulse train in which the power of the laser beam is switched between the plurality of power levels, and recording information to the optical information recording medium at two different linear velocities, the optical information recording apparatus comprising:
a linear velocity setting circuit for setting two different linear velocities;
a recording pulse generation circuit for generating the at least one of the recording pulses and the recording pulse train according to the setting result of the linear velocity setting circuit;
a laser drive circuit for irradiating the optical information recording medium with the laser beam at the plurality of power levels based on the recording pulse train; and
a signal quality detecting circuit for detecting a quality of a reproduction signal,
wherein the laser drive circuit controls the recording power so as to satisfy (Pp1/Ppth1)<(Pp2/Ppth2), where (i) Ppth1 is a threshold value of the recording power at which the quality of the reproduction signal drops under a specific value, when a test signal is recorded at a first linear velocity v1, with the erasure power fixed and the recording power varied, (ii) Ppth2 is the threshold value of the recording power at which the quality of the reproduction signal drops under a specific value, when the test signal is recorded at a second linear velocity v2 that is higher than the first linear velocity v1, with the erasure power fixed and the recording power varied, (iii) Pp1 is the recording power, when the information is recorded at the first linear velocity v1, and (iv) Pp2 is the recording power, when the information is recorded at the second linear velocity v2.

29. The optical information recording apparatus according to claim 28, wherein the signal quality detecting circuit is a jitter detecting circuit that detects jitter in the reproduction signal.

30. The optical information recording apparatus according to claim 28, wherein the signal quality detecting circuit is an error rate detecting circuit that detects an error rate of the reproduction signal.

31. The optical information recording apparatus according to claim 28, wherein the signal quality detecting circuit is a modulation detecting circuit that detects a degree of modulation in the reproduction signal.

32. The optical information recording apparatus according to claim 28, wherein the optical information recording apparatus is included in a recording system that is a CAV recording system.

33. The optical information recording apparatus according to claim 28, wherein the recording power is controlled so that Pp is increased according to an increase in a linear velocity v, when Pp is the recording power at the linear velocity v, which is a value between the first linear velocity v1 and the second linear velocity v2.

34. The optical information recording apparatus according to claim 28, wherein the power level between recording pulses is controlled to be different from the erasure power.

35. The optical information recording apparatus according to claim 28, wherein a power coefficient between recording pulses at the second linear velocity v2 is controlled to be higher than the power coefficient between recording pulses at the first linear velocity v1, when the power coefficient between recording pulses is $\alpha$ and $\alpha=(Pbtm-Pb)/(Pp-Pb)$, where Pp is the recording power, Pb is the erasure power, and Pbtm is the power level between recording pulses.

36. An optical information recording apparatus for irradiating an optical information recording medium with a laser beam, forming at least one of marks and spaces to vary optical characteristics of a recording film of the optical information recording medium, forming the marks by at least one of recording pulses in which a power of the laser beam is switched between a plurality of power levels including at least a recording power and an erasure power, and recording a recording pulse train in which the power of the laser beam is switched between the plurality of power levels, and recording information to the optical information recording medium at two different linear velocities, the optical information recording apparatus comprising:
 a linear velocity setting circuit for setting two different linear velocities;
 a recording pulse generation circuit for generating the at least one of the recording pulses and the recording pulse train according to the setting result of the linear velocity setting circuit;
 a laser drive circuit for irradiating the optical information recording medium with the laser beam at the plurality of power levels based on the recording pulse train; and
 a signal quality detecting circuit for detecting a quality of a reproduction signal,
 wherein the laser drive circuit controls the recording power so as to satisfy (Pp1/Ppth1)<(Pp2/Ppth2), where (i) Ppth1 is a threshold value of the recording power at which the quality of the reproduction signal drops under a specific value, when a test signal is recorded at a first linear velocity v1, with the erasure power and the recording power varied such that a ratio between the erasure power and the recording power is constant, (ii) Ppth2 is the threshold value of the recording power at which the quality of the reproduction signal drops under a specific value, when the test signal is recorded at a second linear velocity v2 that is higher than the first linear velocity v1, with the erasure power and the recording power varied such that the ratio between the erasure power and the recording power is constant, (iii) Pp1 is the recording power, when the information is recorded at the first linear velocity v1, and (iv) Pp2 is the recording power, when the information is recorded at the second linear velocity v2.

37. An optical information recording apparatus for irradiating an optical information recording medium with a laser beam, forming at least one of marks and spaces to vary optical characteristics of a recording film of the optical information recording medium, forming the marks by at least one of recording pulses in which a power of the laser beam is switched between a plurality of power levels including at least a recording power and an erasure power, and recording a recording pulse train in which the power of the laser beam is switched between the plurality of power levels, and recording information to the optical information recording medium at two different linear velocities, the optical information recording apparatus comprising:
 a linear velocity setting circuit for setting two different linear velocities;
 a recording pulse generation circuit for generating the at least one of the recording pulses and the recording pulse train according to the setting result of the linear velocity setting circuit;
 a laser drive circuit for irradiating the optical information recording medium with the laser beam at the plurality of power levels based on the recording pulse train; and
 a signal quality detecting circuit for detecting a quality of a reproduction signal,
 wherein the laser drive circuit controls the recording power so as to satisfy a1<a2, where (i) a1 is an asymmetry of the reproduction signal, when a test signal is recorded at a first linear velocity v1, with the erasure power fixed and the recording power varied, and (ii) a2 is the asymmetry of the reproduction signal, when the test signal is recorded at a second linear velocity v2 that is higher than the first linear velocity v1, with the erasure power fixed and the recording power varied.

38. The optical information recording apparatus according to claim 37, wherein the recording power is controlled so that Pp is increased according to an increase in a linear velocity v, when Pp is the recording power at the linear velocity v, which is a value between the first linear velocity v1 and the second linear velocity v2.

39. The optical information recording apparatus according to claim 37, wherein the power level between recording pulses is controlled to be different from the erasure power.

40. The optical information recording apparatus according to claim 37, wherein a power coefficient between recording pulses at the second linear velocity v2 is controlled to be higher than the power coefficient between recording pulses at the first linear velocity v1, when the power coefficient between recording pulses is $\alpha$ and $\alpha=(Pbtm-Pb)/(Pp-Pb)$, where Pp is the recording power, Pb is the erasure power, and Pbtm is the power level between recording pulses.

41. An optical information recording apparatus for irradiating an optical information recording medium with a laser beam, forming at least one of marks and spaces to vary optical characteristics of a recording film of the optical information recording medium, forming the marks by at least one of recording pulses in which a power of the laser beam is switched between a plurality of power levels including at least a recording power and an erasure power, and recording a recording pulse train in which the power of the laser beam is switched between the plurality of power levels, and recording information to the optical information recording medium at two different linear velocities, the optical information recording apparatus comprising:

a linear velocity setting circuit for setting two different linear velocities;

a recording pulse generation circuit for generating the at least one of the recording pulses and the recording pulse train according to the setting result of the linear velocity setting circuit;

a laser drive circuit for irradiating the optical information recording medium with the laser beam at the plurality of power levels based on the recording pulse train; and a signal quality detecting circuit for detecting a quality of a reproduction signal, wherein the laser drive circuit controls the recording power so as to satisfy a1<a2, where (i) a1 is an asymmetry of the reproduction signal, when a test signal is recorded at a first linear velocity v1, with the erasure power and the recording power varied such that a ratio between the erasure power and the recording power is constant, and (ii) a2 is the asymmetry of the reproduction signal, when the test signal is recorded at a second linear velocity v2 that is higher than the first linear velocity v1, with the erasure power and the recording power varied such that the ratio between the erasure power and the recording power is constant.

* * * * *